US012154595B2

(12) United States Patent
Oulès et al.

(10) Patent No.: US 12,154,595 B2
(45) Date of Patent: Nov. 26, 2024

(54) UTILIZING MULTIPLE VERSIONS OF MUSIC FOR VIDEO PLAYBACK

(71) Applicant: GoPro, Inc., San Mateo, CA (US)

(72) Inventors: Guillaume Oulès, Bordeaux (FR); Anais Oulès, Bordeaux (FR)

(73) Assignee: GoPro, Inc., San Mateo, CA (US)

(*) Notice: Subject to any disclaimer, the term of this patent is extended or adjusted under 35 U.S.C. 154(b) by 169 days.

(21) Appl. No.: 17/901,136

(22) Filed: Sep. 1, 2022

(65) Prior Publication Data

US 2022/0415363 A1 Dec. 29, 2022

Related U.S. Application Data

(63) Continuation of application No. 17/361,920, filed on Jun. 29, 2021, now Pat. No. 11,462,248.

(51) Int. Cl.
*G11B 27/036* (2006.01)
*G06F 3/16* (2006.01)
*G11B 27/10* (2006.01)

(52) U.S. Cl.
CPC ............ *G11B 27/036* (2013.01); *G06F 3/165* (2013.01); *G11B 27/10* (2013.01)

(58) Field of Classification Search
CPC ..... G11B 27/036; G11B 27/10; G11B 27/031; G06F 3/165

USPC .................................................. 386/285
See application file for complete search history.

(56) References Cited

U.S. PATENT DOCUMENTS

| 11,462,248 | B1 | 10/2022 | Guillaume | |
|---|---|---|---|---|
| 2015/0268924 | A1* | 9/2015 | Torrales, Jr. | ......... G11B 27/031 715/716 |
| 2018/0295427 | A1* | 10/2018 | Leiberman | ......... H04N 21/8456 |
| 2020/0372924 | A1* | 11/2020 | Kumar | .................... G10L 25/54 |
| 2021/0272543 | A1* | 9/2021 | Moore | ................. G10H 1/0025 |
| 2022/0157347 | A1 | 5/2022 | Lefebvre | |

FOREIGN PATENT DOCUMENTS

| JP | 3615378 B2 | 2/2005 |
|---|---|---|
| JP | 3892082 B2 | 3/2007 |
| JP | 4036952 B2 | 1/2008 |

* cited by examiner

*Primary Examiner* — Loi H Tran
(74) *Attorney, Agent, or Firm* — ESPLIN & ASSOCIATES, PC

(57) ABSTRACT

A playback of a video may be generated to include accompaniment of music. For parts of the video that includes voice, an instrumental version of the music may be used. For parts of the video that does not include voice, a singing version of the music may be used.

20 Claims, 5 Drawing Sheets

UTILIZING MULTIPLE VERSIONS OF MUSIC FOR VIDEO PLAYBACK

FIELD

This disclosure relates to utilizing multiple versions of music for video playback.

BACKGROUND

A user may wish to create a video edit that includes music. For example, a user may choose a particular piece of music to provide accompaniment for the video edit. However, mixes voices from different sources may degrade the quality of the video edit. For example, if singing voices in the music and voices in the video (e.g., people speaking in the video) occur at the same time, it may be difficult to understand any of the voices. That is, voices for different sources may interfere with each other.

SUMMARY

This disclosure relates to utilizing multiple versions of music for video playback. Video information, singing music information, instrumental music information and/or other information may be obtained. The video information may define a video having a video progress length. The video may include visual content, audio content, and/or other content. The audio content may include voice in part(s) of the video progress length. The singing music information may define a singing version of music. The singing version of the music may have a singing progress length. The singing version of the music may include singing voice in part(s) of the singing progress length. The instrumental music information may define an instrumental version of the music. The instrumental version of the music may have an instrumental progress length. The instrumental version of the music may not include the singing voice in part(s) of the instrumental progress length that correspond to the part(s) of the singing progress length.

The part(s) of the video progress length in which the audio content includes the voice may be identified. Replacement part(s) of the instrumental progress length may be identified based on the part(s) of the video progress length in which the audio content includes the voice and/or other information. The replacement part(s) of the instrumental progress length may include the part(s) of the instrumental progress length that correspond to the part(s) of the singing progress length. A playback of the video that includes accompaniment of the singing version of the music and the instrumental version of the music may be generated. The playback of the video may include the replacement part(s) of the instrumental progress length such that the part(s) of the instrumental progress length are included in place of the part(s) of the singing progress length for the part(s) of the video progress length.

A system that utilizes multiple versions of music for video playback may include one or more electronic storage, processor, and/or other components. The electronic storage may store video information, information relating to a video, information relating to visual content, information relating to audio content, information relating to voice, music information, information relating to music, singing music information, information relating to a single version of the music, information relating to singing voice, instrumental music information, information relating to an instrumental version of the music, information relating to identification of parts of progress length, information relating to generation of video playback, and/or other information.

The processor(s) may be configured by machine-readable instructions. Executing the machine-readable instructions may cause the processor(s) to facilitate utilizing multiple versions of music for video playback. The machine-readable instructions may include one or more computer program components. The computer program components may include one or more of a video component, singing music component, instrumental music component, voice component, replacement component, playback component, and/or other computer program components.

The video component may be configured to obtain video information and/or other information. The video information may define a video having a video progress length. The video may include visual content, audio content, and/or other content. The audio content may include voice in one or more parts of the video progress length.

The singing music component may be configured to obtain singing music information and/or other information. The singing music information may define a singing version of music. The singing version of the music may have a singing progress length. The singing version of the music may include singing voice in one or more parts of the singing progress length.

The instrumental music component may be configured to obtain instrumental music information and/or other information. The instrumental music information may define an instrumental version of the music. The instrumental version of the music may have an instrumental progress length. The instrumental version of the music may not include the singing voice in one or more parts of the instrumental progress length that correspond to the part(s) of the singing progress length. In some implementations, the instrumental version of the music may be generated based on reduction of the singing voice in the singing version of the music.

The voice component may be configured to identify the part(s) of the video progress length in which the audio content includes the voice. The part(s) of the video progress length in which the audio content includes the voice may be identified based on analysis of the audio content and/or other information.

The replacement component may be configured to identify one or more replacement parts of the instrumental progress length based on the part(s) of the video progress length in which the audio content includes the voice and/or other information. The replacement part(s) of the instrumental progress length may include the part(s) of the instrumental progress length that correspond to the part(s) of the singing progress length.

In some implementations, the replacement part(s) of the instrumental progress length of the instrumental version of the music may be identified to be same as the part(s) of the video progress length in which the audio content includes the voice.

In some implementations, the replacement part(s) of the instrumental progress length of the instrumental version of the music may be identified to be longer than the part(s) of the video progress length in which the audio content includes the voice.

In some implementations, the replacement part(s) of the instrumental progress length may be identified further based on a structure of the music. The structure of the music may include an intro, an outro, one or more verses, one or more choruses, one or more breaks, and/or other structural components. The replacement part(s) of the instrumental progress length may be identified to include entirety of a given verse or a given chorus based on a given voice in the audio content overlapping with at least a portion of the given verse or the given chorus. The replacement part(s) of the instrumental progress length may be identified to not include the intro, the outro, or the break(s).

The playback component may be configured to generate a playback of the video that includes accompaniment of the singing version of the music and the instrumental version of the music. The playback of the video may include the replacement part(s) of the instrumental progress length such that the part(s) of the instrumental progress length are included in place of the part(s) of the singing progress length for the part(s) of the video progress length.

In some implementations, volume of the singing version of the music and volume of the instrument version of the music may be equalized based on volume of one or more instruments in the singing version of the music and volume of the one or more instruments in the instrumental version of the music. In some implementations, volume of the voice in the audio content and volume of the singing voice in the singing version of the music may be equalized.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
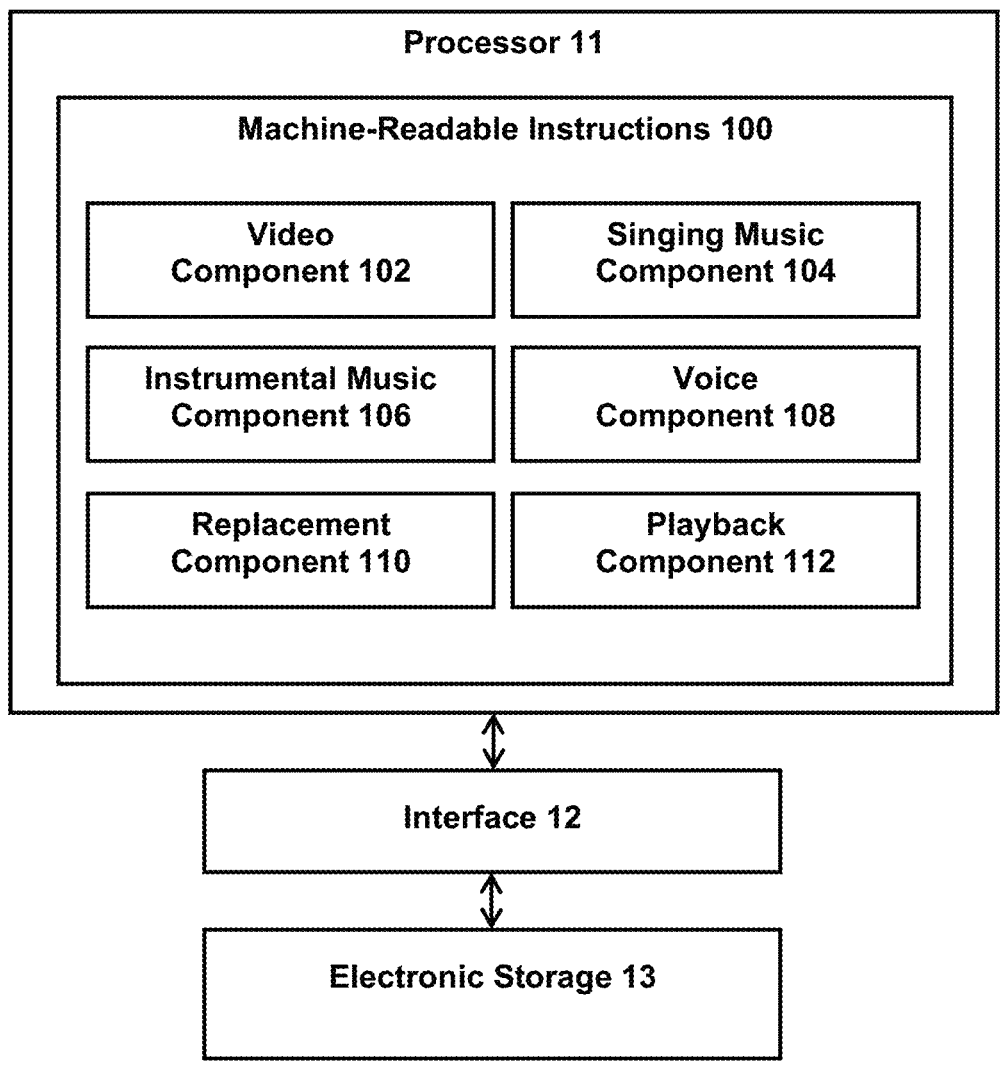
FIG. 1 illustrates a system that utilizes multiple versions of music for video playback.

FIG. 1 illustrates a system 10 that utilizes multiple versions of music for video playback. The system 10 may include one or more of a processor 11, an interface 12 (e.g., bus, wireless interface), an electronic storage 13, and/or other components. Video information, music information, and/or other information may be obtained by the processor 11. Video information, singing music information, instrumental music information and/or other information may be obtained by the processor 11. The video information may define a video having a video progress length. The video may include visual content, audio content, and/or other content. The audio content may include voice in part(s) of the video progress length. The singing music information may define a singing version of music. The singing version of the music may have a singing progress length. The singing version of the music may include singing voice in part(s) of the singing progress length. The instrumental music information may define an instrumental version of the music. The instrumental version of the music may have an instrumental progress length. The instrumental version of the music may not include the singing voice in part(s) of the instrumental progress length that correspond to the part(s) of the singing progress length.

The part(s) of the video progress length in which the audio content includes the voice may be identified by the processor 11. Replacement part(s) of the instrumental progress length may be identified by the processor 11 based on the part(s) of the video progress length in which the audio content includes the voice and/or other information. The replacement part(s) of the instrumental progress length may include the part(s) of the instrumental progress length that correspond to the part(s) of the singing progress length. A playback of the video that includes accompaniment of the singing version of the music and the instrumental version of the music may be generated by the processor 11. The playback of the video may include the replacement part(s) of the instrumental progress length such that the part(s) of the instrumental progress length are included in place of the part(s) of the singing progress length for the part(s) of the video progress length.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, information relating to audio content, information relating to voice, music information, information relating to music, singing music information, information relating to a single version of the music, information relating to singing voice, instrumental music information, information relating to an instrumental version of the music, information relating to identification of parts of progress length, information relating to generation of video playback, and/or other information.

Content of one or more videos may be referred to as video content. Video content may have a video progress length. That is, a video may include video content having a video progress length. A video progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other video progress lengths, time durations, and frame numbers are contemplated.

Video content may include visual content, audio content, and/or other content. For example, video content may include visual content viewable as a function of progress through the video progress length of the video content, audio content playable as a function of progress through the video progress length of the video content, and/or other content that may be played back as a function of progress through the video progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the video progress length of the video content. A video frame may include an image of the video content at a moment within the video progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate utilizing multiple versions of music for video playback. The machine-readable instructions 100 may include one or more computer program components. The machine-readable instructions 100 may include one or more of a video component 102, singing music component 104, instrumental music component 106, voice component 108, replacement component 110, playback component 112, and/or other computer program components.

The video component 102 may be configured to obtain video information and/or other information. Obtaining video information may include one or more of accessing, acquiring, analyzing, determining, examining, generating, identifying, loading, locating, opening, receiving, retrieving, reviewing, selecting, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more sensors, electronic storage of a device accessible via a network, and/or other locations. The video information component 102 may obtain video information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to generate a video edit (e.g., a video edit that includes music). The video information defining a video may be obtained based on the user's selection of the video through the user interface/video application. Other selections of video for retrieval of video information are contemplated.

Figure 3:
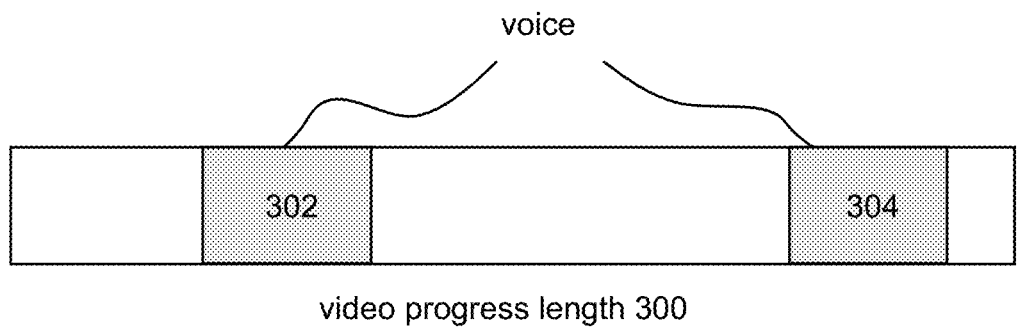
FIG. 3 illustrates an example video progress length.

The video information may define a video. The video may have a video progress length. The video may include video content, such as visual content, audio content, and/or other content, having a video progress length. The audio content of the video may include voice in one or more parts of the video progress length. That is, the audio content of the video may include voice (e.g., one or more persons speaking) in one or more parts (temporal parts) of the video. For example, FIG. 3 illustrates an example video progress length 300 of a video. The video may include voice in a part 302 and a part 304 of the video progress length 300.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial audio content.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The singing music component 104 may be configured to obtain singing music information and/or other information. Obtaining singing music information may include one or more of accessing, acquiring, analyzing, determining, examining, generating, identifying, loading, locating, opening, receiving, retrieving, reviewing, selecting, storing, and/or otherwise obtaining the singing music information. The singing music component 104 may obtain singing music information from one or more locations. For example, the singing music component 104 may obtain singing music information from a storage location, such as the electronic storage 13, electronic storage of information and/or signals generated by one or more sensors, electronic storage of a device accessible via a network, and/or other locations. The singing music component 104 may obtain singing music information from one or more hardware components (e.g., a sound sensor) and/or one or more software components (e.g., software running on a computing device).

In some implementations, the singing music component 104 may obtain singing music information based on user interaction with a user interface/application (e.g., video editing application, video player application), and/or other information. For example, a user interface/application may provide option(s) for a user to select music/singing version of music for a video edit (e.g., music to provide accompaniment for the video edit). The singing music information defining a singing version of music may be obtained based on the user's selection of the music/the singing version of the music through the user interface/video application. Other selections of music for retrieval of singing music information are contemplated.

The singing music information may define a singing version of music. Music may refer to vocal, instrumental, and/or mechanical sounds that have rhythm, melody, and/or harmony. Music may include recorded music, generated music (computer-synthetized music), and/or types of music. For example, music may refer to a song. The singing version of music may refer to a version of music that includes singing. The singing version of music may refer to a version of music that includes voice. Voice in the singing version of the music may be uttered with musical inflections and/or utters to produce musical sounds. Such voice may be referred to as singing voice.

Figure 4:
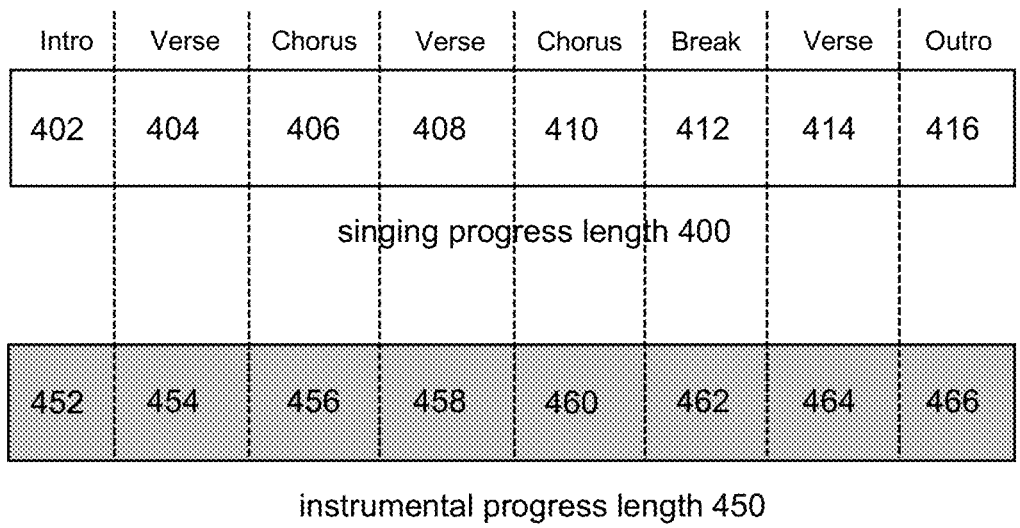
FIG. 4 illustrates an example singing progress length and an example instrumental progress length.

The singing version of the music may have a singing progress length (e.g., song duration). The singing version of the music may include singing voice in one or more parts of the singing progress length. That is the singing version of the music may include singing voice (e.g., one or more persons singing) in one or more parts (temporal part(s)) of the music. For example, FIG. 4 illustrates an example singing progress length 400 of a singing version of music. The singing progress length 400 may include multiple parts, such as an intro 402, a verse 404, a chorus 406, a verse 408, a chorus 410, a break 412, a verse 414, and an outro 416. Other structures of singing version of music are contemplated. The singing version of the music may include singing voice in one or more parts, such as in the verse 404, the chorus 406, the verse 408, the chorus 410, and the verse 414. The singing version of the music may not include singing voice in one or more parts, such as in the intro 402, the break 412, and the outro 416. While the singing progress length 400 in FIG. 4 is shown as being the same length as the video progress length 300 in FIG. 3, this is merely as an example and is not meant to be limiting.

The singing music information may define a singing version of music by including information that defines one or more content, qualities, attributes, features, and/or other aspects of the singing version of music. For example, the singing music information may define a singing version of music by including information that makes up the content of the singing version of music and/or information that is used to determine the content of the singing version of music. For instance, the singing music information may include information that makes up and/or is used to determine the characteristics, timing, and/or structure of sounds within the singing version of music. The singing music information may include a recording of the singing version of music and/or information that makes up and/or is used to facilitate playback of the singing version of music. For example, the singing music information may define a recording of the singing version of music, which may be played back. As another example, the singing music information may define characteristics of the singing version of music, and the characteristics of the singing version of music may be used to effectuate playback of the singing version of music. Other types of singing music information are contemplated.

The singing version of the music may be selected to provide accompaniment for the video. For example, the singing version of the music may provide accompaniment for one or more portions of the video or for the entirety of the video. Simply using the singing version of the music as accompaniment for the video may cause conflict between voices in the video and voices in the singing version of the music. For example, simply using the singing version of the music as accompaniment for the video may cause voice in the part 302 of the video to be played at the same time as the voice (singing voice) in the verse 404 and the chorus 406 of the singing version of the music, and may cause voice in the part 304 of the video to be played at the same time as the voice in the verse 414 of the singing version of the music. Such playback of voices in the video and in the singing version of the music may make one or both of the voices difficult to understand. Volume of the music may be lowered to reduce the conflict in voices, but such volume reduction may be disruptive to toward those watching the video. Change in volume of the music may be evident and take viewers out of their experience in watching the video. Additionally, conflict between the voices in the video and the music may still exist.

The instrumental music component 106 may be configured to obtain instrumental music information and/or other information. Obtaining instrumental music information may include one or more of accessing, acquiring, analyzing, determining, examining, generating, identifying, loading, locating, opening, receiving, retrieving, reviewing, selecting, storing, and/or otherwise obtaining the instrumental music information. The instrumental music component 106 may obtain instrumental music information from one or more locations. For example, the instrumental music component 106 may obtain instrumental music information from a storage location, such as the electronic storage 13, electronic storage of information and/or signals generated by one or more sensors, electronic storage of a device accessible via a network, and/or other locations. The instrumental music component 106 may obtain instrumental music information from one or more hardware components (e.g., a sound sensor) and/or one or more software components (e.g., software running on a computing device).

In some implementations, the instrumental music component 106 may obtain instrumental music information based on user interaction with a user interface/application (e.g., video editing application, video player application), and/or other information. For example, a user interface/application may provide option(s) for a user to select music/instrumental version of the music for a video edit. The instrumental music information defining an instrumental version of music may be obtained based on the user's selection of the music/the instrumental version of the music through the user interface/video application. Other selections of music for retrieval of instrumental music information are contemplated.

The instrumental music information may define an instrumental version of the music. The instrumental version of the music may refer to a version of music that does not include singing voices. The instrumental version of the music may refer to a version of music without vocals (articulate vocals). Instrumental version of the music may be the same as the singing version of the music, with the exception that the singing voices in the singing version of the music do not exist in the instrumental version of the music. In some implementations, instrumental version of the music may include background voices (e.g., inarticulate vocal, background choir). For example, the instrumental version of the music may not include primary singing voices but may include background singing voices.

The instrumental version of the music may have an instrumental progress length (e.g., song duration). The instrumental version of the music may not include the singing voice in one or more parts of the instrumental progress length that correspond to the part(s) of the singing progress length that include singing voices. That is, the part(s) of the instrumental version of the music, which occupy the same time duration(s) as the part(s) of the singing progress length that includes singing voice, may not include singing voice.

For example, FIG. 4 illustrates an example instrumental progress length 450 of an instrumental version of music. The instrumental progress length 450 may include multiple parts 452, 454, 456, 458, 460, 462, 464, 466. Other structures of instrumental version of music are contemplated. The instrumental version of the music may not include voice (singing voice) in those part(s) of the music in which the singing version of the music includes voice (singing voice). For example, the parts 454, 456, 458, 460, 464 of the instrumental version of the music may not include voice. Other parts of the instrumental version of the music may not include voice.

In some implementations, the instrumental version of the music may be generated separately from the singing version of the music. For example, the singing version of the music may include a recording of the music with singing voice, while the instrumental version of the music may include a recording of the music without singing voice. In some implementations, the instrumental version of the music may be generated based on reduction of the singing voice in the singing version of the music. Reduction of the singing voice in the singing version of the music may include lowering the volume of and/or removal of the singing voice in the singing version of the music. For example, the instrumental version of the music may be generated by suppressing voices in the singing version of the music.

The instrumental music information may define an instrumental version of music by including information that defines one or more content, qualities, attributes, features, and/or other aspects of the instrumental version of music. For example, the instrumental music information may define an instrumental version of music by including information that makes up the content of the instrumental version of music and/or information that is used to determine the content of the instrumental version of music. For instance, the instrumental music information may include information that makes up and/or is used to determine the characteristics, timing, and/or structure of sounds within the instrumental version of music. The instrumental music information may include a recording of the instrumental version of music and/or information that makes up and/or is used to facilitate playback of the instrumental version of music. For example, the instrumental music information may define a recording of the instrumental version of music, which may be played back. As another example, the instrumental music information may define characteristics of the instrumental version of music, and the characteristics of the instrumental version of music may be used to effectuate playback of the instrumental version of music. Other types of instrumental music information are contemplated.

The voice component 108 may be configured to identify the part(s) of the video progress length in which the audio content includes voice. The voice component 108 may be configured to identify the part(s) (temporal part(s)) of the video that includes voice. Identifying the part(s) of the video progress length in which the audio content includes voice may include determining which time portions/durations of the audio content includes voices. Identifying the part(s) of the video progress length in which the audio content includes voice may include determining which time portions/duration within the video progress length includes recording of voice.

The part(s) of the video progress length in which the audio content includes voice may be identified based on analysis of the audio content and/or other information. Analysis of the audio content may include examination, evaluation, processing, studying, and/or other analysis of the audio content. For example, analysis of the audio content may include examination, evaluation, processing, studying, and/or other analysis of one or more features/characteristics of the audio content. For instance, analysis of the audio content may include and/or may utilize framing, windowing, feature extraction, linear predictive coding, perceptual linear prediction, relative spectral filtering, Mel frequency cepstral coefficient, and/or classifier (e.g., hidden Markov model, neural network, dynamic time warping, vector quantization). Use of other techniques to identify voice within the audio content are contemplated. For example, referring to FIG. 3, the audio content of the video may be analyzed to identify the parts 302, 304 of the video progress length 300 as including voice.

The replacement component 110 may be configured to identify one or more replacement parts of the instrumental progress length. The replacement component 110 may be configured to identify the replacement part(s) of the instrumental progress length to be used as accompaniment for the video. The replacement part(s) of the instrumental progress length may be used in place of the part(s) of the singing progress length that includes voice. That is, the replacement component 110 may be configured to identify part(s) (temporal part(s)) of the instrumental version of the music to be used in place of the corresponding part(s) of the singing version of the music.

The replacement component 110 may be configured to identify the replacement part(s) of the instrumental progress length based on the part(s) of the video progress length in which the audio content of the video includes voice and/or other information. That is, the replacement part(s) of the instrumental progress length may be identified based on which part(s) of the video includes voice. The replacement part(s) of the instrumental progress length may include the part(s) of the instrumental progress length that correspond to the part(s) of the singing progress length that include singing voice. In some implementations, the replacement component 110 may be configured to identify the replacement part(s) of the instrumental progress length based on user input. For example, use input may identify parts of the video in which the user does not want presence of singing voice. The replacement component 110 may be configured to identify the replacement part(s) of the instrumental progress length based on user's identification of the parts in which the presence of singing voice is to be reduced.

Figure 5:
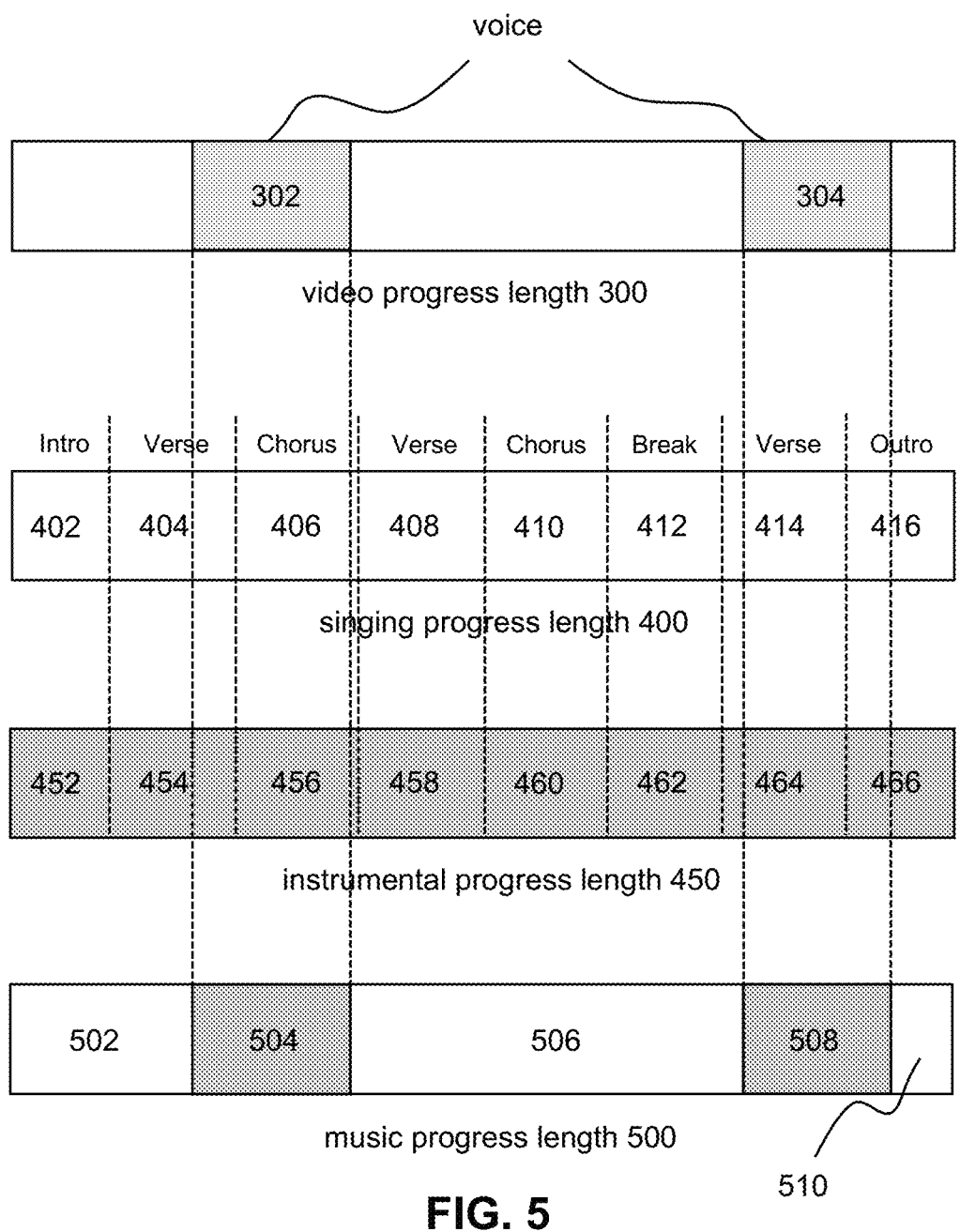
FIG. 5 illustrates an example use of a singing version of music and an instrumental version of music to generate a playback of a video.

In some implementations, the replacement part(s) of the instrumental progress length of the instrumental version of the music may be identified to be same as the part(s) of the video progress length in which the audio content includes the voice. That is, the replacement part(s) of the instrumental progress length may be identified to match/overlap with the parts of the video that includes voice. For example, FIG. 5 illustrates an example identification of replacement parts of instrumental version of music. In FIG. 5, the replacement parts of the instrumental version of music may be identified to match/overlap with the parts 302, 304 of the video that includes voice. The replacement parts of the instrumental version of music identified may include an ending portion of the part 454, most of the part 456 (excluding ending portion of the part 456), most of the part 464 (excluding beginning portion of the part 464), and a beginning portion of the part 456.

In some implementations, the replacement part(s) of the instrumental progress length of the instrumental version of the music may be identified further based on the part(s) of the video progress length including voice overlapping with part(s) of the singing progress length including singing voice. The replacement part(s) of the instrumental progress length may not be identified for part(s) of the video progress length including voice overlapping with part(s) of the singing progress length not including singing voice. For example, referring to FIG. 4, the ending portion of the part 304 of the video may overlap with the outro 416 of the singing version of the music. The outro 416 may not including singing voice, and then a replacement part may not be identified for the ending portion of the part 304. In other words, since the singing version of the music does not include singing voice where a part of the video includes voices, the singing version of the music may be used as accompaniment for the part of the video.

In some implementations, the replacement part(s) of the instrumental progress length of the instrumental version of the music may be identified to be longer than the part(s) of the video progress length in which the audio content includes the voice. The replacement part(s) of the instrumental progress length of the instrumental version of the music may be identified to start before and/or extend after the part(s) of the video progress length in which the audio content includes the voice. That is, the replacement part(s) of the instrumental version of the music to be used as accompaniment for the video may be identified to be longer than the part(s) of the video that includes voices.

In some implementations, the replacement part(s) of the instrumental progress length may be identified further based on a structure of the music. The structure of the music may refer to arrangement and/or relations between different parts of the music. The structure of the music may refer to organization of the parts of the music. For example, the structure of the music may include an intro, an outro, one or more verses, one or more choruses, one or more breaks, and/or other structural components/parts. In some implementations, information on the structure of the music may be obtained from analysis of the music, information on lyrics of the music and timing of singing voice, and/or other information.

The replacement part(s) of the instrumental progress length may be identified to include entirety of a structural component/part based on the voice in the audio content of the video overlapping lapping with at least a portion of the structural component/part. For example, the replacement part(s) of the instrumental progress length may be identified to include entirety of a given verse or a given chorus based on a given voice in the audio content of the video overlapping with at least a portion of the given verse or the given chorus. Such identification of replacement parts may incorporate the musical structure (segmentation) of the music to include/not include cohesive structural components/parts as accompaniment. That is, rather than switching between singing version and instrumental version of the music partway through a structural component/part (e.g., verse, chorus), switching may occur at the beginning/ending of the structural component/part.

The replacement part(s) of the instrumental progress length may be identified to not include certain structural component(s)/part(s). That is, structure of the music may be used to always use the singing version of the music for certain structural component(s)/part(s) even when the voice includes voice in the corresponding part(s). For example, the replacement part(s) of the instrumental progress length may be identified to not include the intro, the outro, or the break(s). These structural component(s)/part(s) may be excluded from the identification because they do not contain singing voice (and would not conflict with voices in the video if used as accompaniment).

Figure 6:
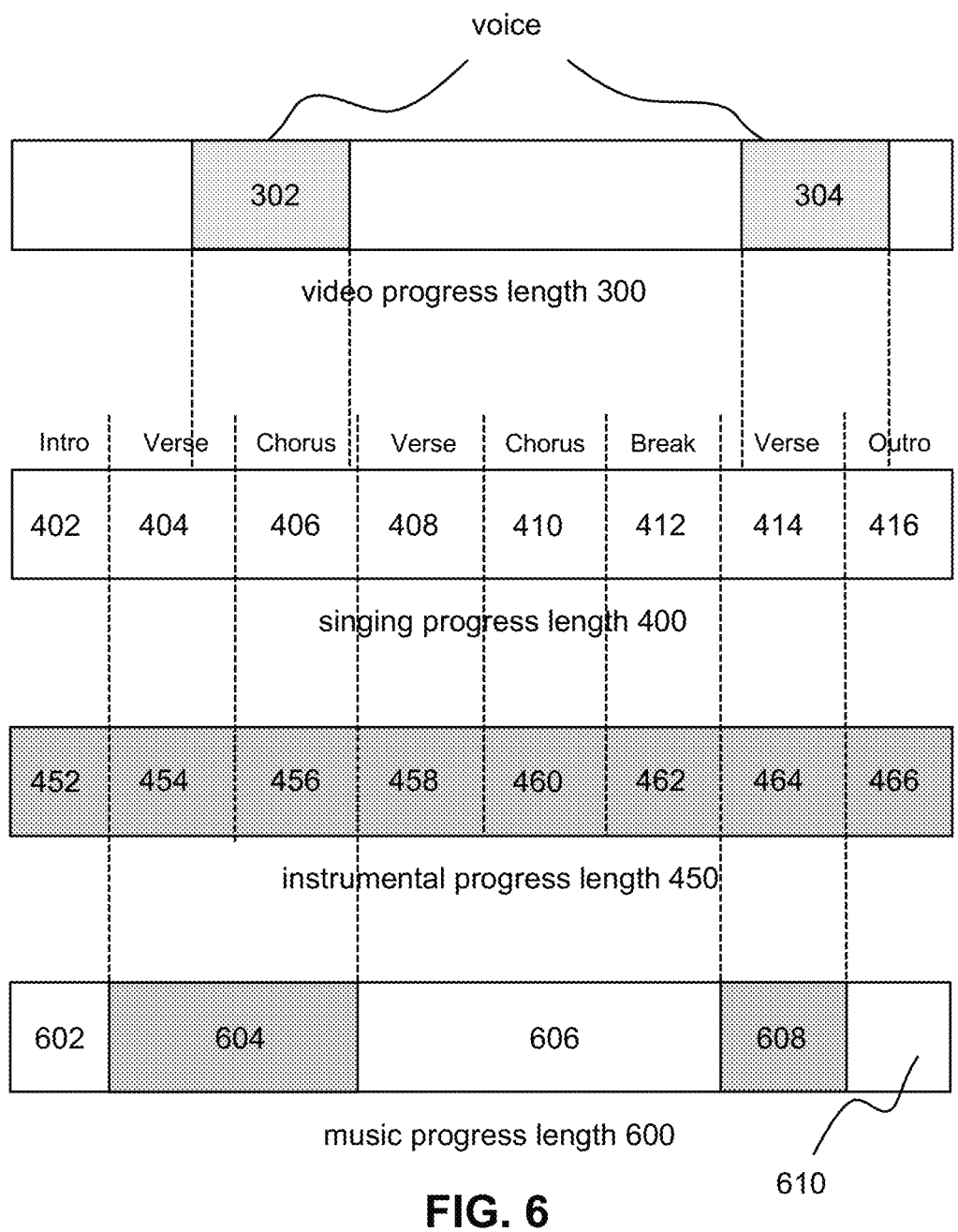
FIG. 6 illustrates an example use of a singing version of music and an instrumental version of music to generate a playback of a video.

For example, FIG. 6 illustrates an example identification of replacement parts of instrumental version of music. In FIG. 6, the replacement parts of the instrumental version of music may be identified based on the structural of the music. The part 302 of the video including voice may match/overlap with the first verse and first chorus of the music.

Responsive to such matching/overlap, the entire parts 454, 456 of the instrumental progress length 450 may be identified as replacement parts. The part 304 of the video including voice may match/overlap with the last verse and outro of the music. Responsive to such matching/overlap, the entire part 464 of the instrumental progress length 450 may be identified as a replacement part. The part 466 of the instrumental progress length 450 may not be identified as a replacement part since the outro of the music does not include singing voice.

The playback component 112 may be configured to generate a playback of the video that includes accompaniment of the music. Generating a playback of the video may include effectuating presentation of the vide on one or more displays. Generating a playback of the video may include generating a version of the video that may be played back at the time of generation and/or afterwards (e.g., generation of a video edit, storage of a video edit file).

The playback of the video may include accompaniment of the singing version of the music and the instrumental version of the music. The playback of the video may include the replacement part(s) of the instrumental progress length such that the replacement part(s) of the instrumental progress length (identified by the replacement component 110) are included in place of the part(s) of the singing progress length for the part(s) of the video progress length that include voice. That is, the playback of the video may include part(s) of the instrumental version of the music for part(s) of the video that include voice. The playback of the video may include part(s) of the instrumental version of the music for those part(s) in which the video includes voice and the singing version of the music includes singing voice.

Such generation of the playback of the video may result in switching between the singing version of the music and the instrumental version of the music based on whether the video includes or does not include voice. For parts of the video including voice, the instrumental version of the music may be used as accompaniment. For parts of the video not including voice, the singing version of the music may be used as accompaniment.

In some implementations, one or more transitions effects may be applied when switching between the singing version of the music and the instrumental version of the music. A transition effect may refer to an effect that changes the singing version of the music and/or the instrumental version of the music when making the playback changes from one version of the music to the other version of the music. The same or different transition effects may be applied to different transitions within the playback of the video. For example, a transition effect may include a cross-fade to gradually change between the singing version of the music and/or the instrumental version of the music. As another example, hysteresis and/or delay may be used in switching between the singing version of the music and/or the instrumental version of the music. Hysteresis/delay may result in different speed of change when switching between the singing version of the music and/or the instrumental version of the music. For example, the transition from singing version of the music to the instrumental version of the music may be applied to happen more quickly than the transition from the instrumental version of the music to the singing version of the music. Use of other transition effects are contemplated.

FIG. 5 illustrates an example use of a singing version of music and an instrumental version of music to generate a playback of a video. FIG. 5 shows an example music progress length 500 of the music used as accompaniment for playback of the video. The music progress length 500 may include parts 502, 504, 506, 508, 510. The parts 502, 506, 510 may include the singing version of the music while the parts 504, 508 may include the instrumental version of the music. The playback shown in FIG. 5 may utilize the instrumental version of the music for the parts 302, 304 of the video that includes voice, and may utilize the singing version of the music for the other parts of the video. The playback shown in FIG. 5 may include portions of the parts 454, 456, 464, 466 of the instrumental version of the music.

FIG. 6 illustrates an example use of a singing version of music and an instrumental version of music to generate a playback of a video. FIG. 6 shows an example music progress length 600 of the music used as accompaniment for playback of the video. The music progress length 500 may include parts 602, 604, 606, 608, 610. The parts 602, 606, 610 may include the singing version of the music while the parts 604, 608 may include the instrumental version of the music. The playback shown in FIG. 6 may utilize the instrumental version of the music to replace the verse 404, the chorus 406, and the verse 414 of the singing version of the music. The playback shown in FIG. 6 may use the structure of the music to identify blocks of singing version of the music to be replaced by the instrumental version of the music. The playback shown in FIG. 6 may include entirety of the parts 454, 456, 464 of the instrumental version of the music.

In some implementations, volume of the singing version of the music and volume of the instrument version of the music may be equalized. Equalizing the volume of the singing version of the music and volume of the instrument version of the music may include making the volume of the singing version of the music and volume of the instrument version of the music used in the playback the same. Equalizing the volume of the singing version of the music and volume of the instrument version of the music may include making the volume of the singing version of the music and volume of the instrument version of the music used in the playback to be within threshold volume of one another. The volume of the singing version of the music and volume of the instrument version of the music may be equalized based on volume of one or more instruments in the singing version of the music, volume of the one or more instruments in the instrumental version of the music, and/or other information. Equalizing the volume of the singing version of the music and volume of the instrument version of the music may include equalizing the volume of the instrument(s) in the singing version of the music and the volume of the instrument(s) in the instrumental version of the music. Such equalization of the music volume may disregard the presence of singing voice in the singing version of the music. Such equalization of the music volume may result in consistent musical presence in the playback of the video. Whether the singing version of the music of the instrumental version of the music is used, the playback of the video may include consistent volume of the instrument(s) in the music.

In some implementations, volume of the voice in the audio content of the video and volume of the singing voice in the singing version of the music may be equalized. Equalizing the volume of the voice in the audio content of the video and volume of the singing voice in the singing version of the music may include making the volume of the voice in the video and volume of the singing voice in the music used in the playback the same. Equalizing the volume of the voice in the audio content of the video and volume of the singing voice in the singing version of the music may include making the volume of the voice in the video and volume of the singing voice in the music used in the playback to be within threshold volume of one another. Such equalization of the voice in the video and the music volume may result in consistent vocal presence in the playback of the video. Whether the voice heard in the playback is coming from the video of the music, the playback of the video may include consistent volume of voice.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.) magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
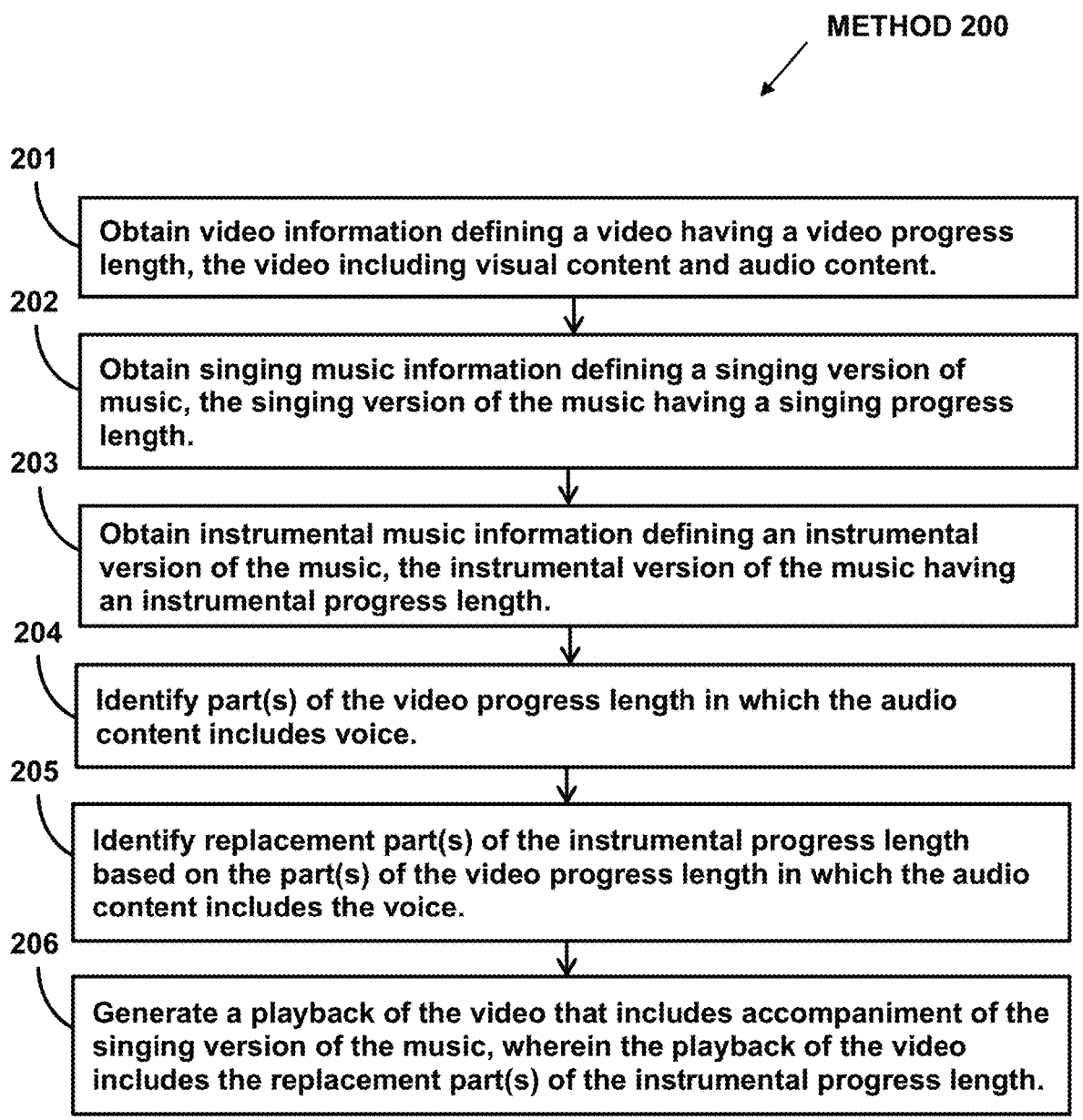
FIG. 2 illustrates a method for utilizing multiple versions of music for video playback.

FIG. 2 illustrates method 200 for utilizing multiple versions of music for video playback. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video having a video progress length. The video may include visual content, audio content, and/or other content. The audio content may include voice in part(s) of the video progress length. In some implementations, operation 201 may be performed by a processor component the same as or similar to the video component 102 (Shown in FIG. 1 and described herein).

At operation 202, singing music information may be obtained. The singing music information may define a singing version of music. The singing version of the music may have a singing progress length. The singing version of the music may include singing voice in part(s) of the singing progress length. In some implementations, operation 202 may be performed by a processor component the same as or similar to the singing music component 104 (Shown in FIG. 1 and described herein).

At operation 203, instrumental music information and may be obtained. The instrumental music information may define an instrumental version of the music. The instrumental version of the music may have an instrumental progress length. The instrumental version of the music may not include the singing voice in part(s) of the instrumental progress length that correspond to the part(s) of the singing progress length. In some implementations, operation 203 may be performed by a processor component the same as or similar to the instrumental music component 106 (Shown in FIG. 1 and described herein).

At operation 204, the part(s) of the video progress length in which the audio content includes the voice may be identified. In some implementations, operation 204 may be performed by a processor component the same as or similar to the voice component 108 (Shown in FIG. 1 and described herein).

At operation 205, replacement part(s) of the instrumental progress length may be identified based on the part(s) of the video progress length in which the audio content includes the voice and/or other information. The replacement part(s) of the instrumental progress length may include the part(s) of the instrumental progress length that correspond to the part(s) of the singing progress length. In some implementations, operation 205 may be performed by a processor component the same as or similar to the replacement component 110 (Shown in FIG. 1 and described herein).

At operation 206, a playback of the video that includes accompaniment of the singing version of the music and the instrumental version of the music may be generated. The playback of the video may include the replacement part(s) of the instrumental progress length such that the part(s) of the instrumental progress length are included in place of the part(s) of the singing progress length for the part(s) of the video progress length. In some implementations, operation 206 may be performed by a processor component the same as or similar to the playback component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for utilizing multiple versions of music for video playback, the system comprising:
    one or more physical processors configured by machine-readable instructions to:
       obtain video information defining a video having a video progress length, the video including recorded voice in one or more parts of the video progress length, the recorded voice including recording of one or more persons speaking during capture of the video;
       obtain singing music information defining a singing version of music, the singing version of the music including singing voice;
       obtain instrumental music information defining an instrumental version of the music, the instrumental version of the music not including the singing voice;
       identify the one or more parts of the video progress length of the video that includes the recorded voice; and
       generate a playback of the video by automatically switching between accompaniment of the singing version of the music and the instrumental version of the music based on whether or not a corresponding moment in the progress length of the video includes the recorded voice, wherein the playback of the video includes accompaniment of the instrumental version of the music that does not include the singing voice for the one or more parts of the video progress length of the video that includes the recording of the one or more persons speaking during the capture of the video and includes accompaniment of the singing version of the music that includes the singing voice for one or more other parts of the video progress length of the video that does not include the recording of the one or more persons speaking during the capture of the video.

2. The system of claim 1, wherein lengths of the instrumental version of the music used as the accompaniment are same as lengths of the video that include the recorded voice.

3. The system of claim 1, wherein lengths of the instrumental version of the music used as the accompaniment are longer than lengths of the video that include the recorded voice.

4. The system of claim 1, wherein the playback of the video switches between the accompaniment of the singing version of the music and the instrumental version of the music further based on a structure of the music.

5. The system of claim 4, wherein the structure of the music includes one or more verses and one or more choruses.

6. The system of claim 5, wherein:
    the instrumental version of the music is used as the accompaniment for entirety of a given verse or a given chorus based on a given recorded voice in the video overlapping with at least a portion of the given verse or the given chorus;
    responsive to the given recorded voice in the video starting after beginning of the given verse or the given chorus, the instrumental version of the music is used as the accompaniment from the beginning of the given verse or the given chorus; and responsive to the given recorded voice in the video finishing before ending of the given verse or the given chorus, the instrumental version of the music is used as the accompaniment through the ending of the given verse or the given chorus.

7. The system of claim 5, wherein an intro, an outro, or a break of the instrumental version of the music is not used as the accompaniment.

8. The system of claim 1, wherein volume of the singing version of the music and volume of the instrument version of the music are equalized based on volume of one or more instruments in the singing version of the music and volume of the one or more instruments in the instrumental version of the music.

9. The system of claim 1, wherein volume of the recorded voice in the video and volume of the singing voice in the singing version of the music are equalized.

10. A method for utilizing multiple versions of music for video playback, the method performed by a computing system including one or more processors, the method comprising:

obtaining, by the computing system, video information defining a video having a video progress length, the video including recorded voice in one or more parts of the video progress length, the recorded voice including recording of one or more persons speaking during capture of the video;

obtaining, by the computing system, singing music information defining a singing version of music, the singing version of the music including singing voice;

obtaining, by the computing system, instrumental music information defining an instrumental version of the music, the instrumental version of the music not including the singing voice;

identifying, by the computing system, the one or more parts of the video progress length of the video that includes the recorded voice; and generating, by the computing system, a playback of the video by automatically switching between accompaniment of the singing version of the music and the instrumental version of the music based on whether or not a corresponding moment in the progress length of the video includes the recorded voice, wherein the playback of the video includes accompaniment of the instrumental version of the music that does not include the singing voice for the one or more parts of the video progress length of the video that includes the recording of the one or more persons speaking during the capture of the video and includes accompaniment of the singing version of the music that includes the singing voice for one or more other parts of the video progress length of the video that does not include the recording of the one or more persons speaking during the capture of the video.

11. The method of claim 10, wherein lengths of the instrumental version of the music used as the accompaniment are same as lengths of the video that include the recorded voice.

12. The method of claim 10, wherein lengths of the instrumental version of the music used as the accompaniment are longer than lengths of the video that include the recorded voice.

13. The method of claim 10, wherein the playback of the video switches between the accompaniment of the singing version of the music and the instrumental version of the music further based on a structure of the music.

14. The method of claim 13, wherein the structure of the music includes one or more verses and one or more choruses.

15. The method of claim 14, wherein;

the instrumental version of the music is used as the accompaniment for entirety of a given verse or a given chorus based on a given recorded voice in the video overlapping with at least a portion of the given verse or the given chorus;

responsive to the given recorded voice in the video starting after beginning of the given verse or the given chorus, the instrumental version of the music is used as the accompaniment from the beginning of the given verse or the given chorus; and responsive to the given recorded voice in the video finishing before ending of the given verse or the given chorus, the instrumental version of the music is used as the accompaniment through the ending of the given verse or the given chorus.

16. The method of claim 14, wherein an intro, an outro, or a break of the instrumental version of the music is not used as the accompaniment.

17. The method of claim 10, wherein volume of the singing version of the music and volume of the instrument version of the music are equalized based on volume of one or more instruments in the singing version of the music and volume of the one or more instruments in the instrumental version of the music.

18. The method of claim 10, wherein volume of the recorded voice in the video and volume of the singing voice in the singing version of the music are equalized.

19. A system for utilizing multiple versions of music for video playback, the system comprising:

one or more physical processors configured by machine-readable instructions to:

obtain video information defining a video having a video progress length, the video including recorded voice in one or more parts of the video progress length, the recorded voice including recording of one or more persons speaking during capture of the video;

obtain singing music information defining a singing version of music, the singing version of the music including singing voice;

obtain instrumental music information defining an instrumental version of the music, the instrumental version of the music not including the singing voice, wherein volume of the singing version of the music and volume of the instrument version of the music are equalized based on volume of one or more instruments in the singing version of the music and volume of the one or more instruments in the instrumental version of the music;

identify the one or more parts of the video progress length of the video that includes the recorded voice; and generate a playback of the video by automatically switching between accompaniment of the singing version of the music and the instrumental version of the music based on whether or not a corresponding moment in the progress length of the video includes the recorded voice, wherein the playback of the video includes accompaniment of the instrumental version of the music that does not include the singing voice for the one or more parts of the video progress length of the video that includes the recording of the one or more persons speaking during the capture of the video and includes accompaniment of the singing version of the music that includes the singing voice for one or more other parts of the video progress length of the video that does not include the recording of the one or more persons speaking during the capture of the video, wherein volume of the recorded voice in the video and the volume of the singing voice in the singing version of the music are equalized.

20. The system of claim 19, wherein:

the playback of the video switches between the accompaniment of the singing version of the music and the instrumental version of the music further based on a structure of the music, the structure of the music including one or more verses and one or more choruses;

the instrumental version of the music is used as the accompaniment for entirety of a given verse or a given chorus based on a given recorded voice in the video overlapping with at least a portion of the given verse or the given chorus;

responsive to the given recorded voice in the video starting after beginning of the given verse or the given chorus, the instrumental version of the music is used as the accompaniment from the beginning of the given verse or the given chorus; and responsive to the given recorded voice in the video finishing before ending of the given verse or the given chorus, the instrumental version of the music is used as the accompaniment through the ending of the given verse or the given chorus.

\* \* \* \* \*